DIGITAL DATA TRANSMISSION SYSTEM HAVING MEANS FOR AUTOMATICALLY SWITCHING THE STATUS OF INPUT-OUTPUT CONTROL UNITS
Filed March 27, 1967 3 Sheets-Sheet 1

INVENTOR.
JAMES RUSSELL BENNETT
KENNETH D. JAMES
BY
Christie, Parker & Hale
ATTORNEYS United States Patent Office 3,512,133
Patented May 12, 1970

3,512,133

DIGITAL DATA TRANSMISSION SYSTEM HAVING MEANS FOR AUTOMATICALLY SWITCHING THE STATUS OF INPUT-OUTPUT CONTROL UNITS

James Russell Bennett, Glendora, and Kenneth O. James, Pomona, Calif., assignors to Burroughs Corporation, Detroit, Mich., a corporation of Michigan Filed Mar. 27, 1967, Ser. No. 626,012
Int. Cl. G06f 3/00
U.S. Cl. 340—172.5 10 Claims

ABSTRACT OF THE DISCLOSURE

A digital data transmission system in which an input-output control unit which controls communications between a main memory of the system and a remote input-output unit is automatically caused to switch from a "write" to a "read" status upon the termination of a message written into the remote unit during execution of a "flip" command. Detection circuitry determines the presence of such a command and detects the end of the message being written and control circuitry responsive thereto causes the control unit to switch to a "read" state wherein it is able to respond to a reply message transmitted to the control unit by the remote unit. In another embodiment, an input-output control unit is repeatedly switched back and forth in responsible to the termination of polling signals sequentially transmitted to a plurality of remote units communicating with the control unit and in response to "negative-acknowledgement" signals returned by the remote units. A positive signal returned by a remote unit terminates such switching.

BACKGROUND OF THE INVENTION

This invention relates to data communication systems and more particularly to such systems having a fast turnaround time with respect to the transmission of data between units of the system.

Computer systems in which the main memory of the computer is time-shared by one or more processing units and by a plurality of peripheral devices have become well-known in recent years. In such systems, the central control unit allocates requests for accesses to the main memory made by processors and by the peripheral devices. By operating in such a manner, many processing and input-output operations may be executed simultaneously. Consequently, many users may operate the computer simultaneously, or apparently simultaneously, in such a way that each is, or may be, completely unaware of the use being made of the computer by others. Additionally, a number of programs may be executed such that none needs to be completed before another is started or continued. Where several independent processors are utilized in the system, each may have access to a common main memory of the system.

In systems of the type described in the preceding paragraph, the central control unit of the system allocates accesses to main memory which are requested by the various devices. A device having access to the memory during any given memory cycle need not, and probably will not, have access to the memory during the immediately succeeding memory cycle. Thus during successive memory cycles, the memory may be utilized in conjunction with entirely unrelated operations. The device which receives access to memory at any given time is determined on the basis of decisions made by the central control unit which thereby achieves optimum usage of the main memory and assures that all simultaneously performed operations will be executed, insofar as possible, on a basis such that each of the operations is unaware that others are also being executed.

Transmission of data over long distances via commercially available transmission lines has long been known. Such transmission may occur, for example, over the Bell System telephone network, over the TWX network, the Telex network, or over leased lines. Recently, the transmission of data over such data communication lines has been made directly communicable with computer systems. Thus, a computer system may transmit data via data communication lines directly to, or receive data from, a terminal unit which may be several thousand miles away.

The various input-output units utilized in a computer system having a time-shared main memory ordinarily communicate with the central control unit of the system via a plurality of input-output control units and a plurality of input-output channels. Each input-output unit will often have an individual control unit and an individual input-output channel associated with it. When a large number of data communication lines must communicate with the central control unit, it is often uneconomic to provide an individual control unit and input-output unit for each line. Since the transmission of data over the communication lines is relatively slow, it is possible to provide a single multi-line input-output control unit for all of the data communication lines. Data transmitted over all of the lines is thereby funnelled into a single input-output channel between the multi-line control unit and the central control unit.

Each data communication line is coupled to the multi-line control unit via a line adapter. The line adapters enable remote input-output units of different types to be connected to the same multi-line control unit. Among other functions, they provide a common interface between the transmission lines to the remote input-output units and the multi-line control unit.

Control circuitry within the multi-line control unit must respond to signals provided by a line adapter which manifest characteristics of the particular type of remote input-output unit associated with that adapter. Thus, for example, the signals will designate whether the particular remote input-output unit transmits characters with the most significant bit first or the least significant bit first; the number of bits per character; whether horizontal parity is used; whether vertical parity is used; whether even or odd parity is used; whether transmission is synchronous or asynchronous; etc. Logic circuitry must be provided within the control unit which responds to these signals and causes the entire multi-line control unit to behave in a proper manner to control transmission of data between the computer and the remote input-output unit associated with the particular line adapter.

In computer systems of the type generally described above, a request that an input-output operation be initiated will cause software within the system to effect processor execution of an "initiate input-output" command. Such a command will designate the particular input-output channel which is to be utilized and the address of the input-output command which is to be executed. Subsequently the processor fetches the input-output command from memory and transmits it to the input-output control unit associated with the particular channel, thereafter turning over execution of this command to the input-output control unit. Upon completion of execution of this command, the input-output control unit transmits to the central control unit a result descriptor word which indicates that the command has been executed and that the channel is again available. If the command were a "write" command, for example, then upon completion of the writing of data from memory to the selected remote input-output unit, the result descriptor would be stored in memory and an interrupt signal would be sent to the processor. If the remote input-output unit is of the type which senses the end of the "received" message and transmits an acknowledgment, the "interrupt" must be detected, software must provide another "initiate input-output" command and the processor must then execute this command and fetch a "read" command directed to the selected remote input-output unit, all before the acknowledgment signal is transmitted. Unless this occurs, the input-output control unit associated with the remote input-output unit will not be in a "read" status prior to receiving the return acknowledgment and the acknowledgement will consequently be lost. This possibility is increased in systems where multi-programming is carried out. In such systems the software must provide a supervisory program which schedules object programs, allocates memory and input-output units, handles input-output operations and controls the multi-processing. The possibiilty that the processor may be busy and unable to provide a "read" command to an input-output control unit in time to enable the control unit to receive a signal transmitted from a remote input-output unit is increased in such a system. The possibility that an acknowledgment signal may be lost is also increased in systems in which many remote input-output units, which transmit signals over a plurality of data communication lines, communicate with the processor over a single input-output channel under the control of a single multi-line input-output control unit.

In many computer systems of the type generally described above it is necessary to poll all of a plurality of remote input-output units associated with a single data communication line in order to determine whether they have information ready to send to main memory. If they do not have such information they respond by returning a single character "negative-acknowledgment"; while if they do, they respond by returning a message. In addition to the problem set forth in the preceding paragraph, it is extremely time-consuming if a separate "initiate input-output" command must be provided by the software with respect to each such input-output unit being polled. Since most of the remote input-output units will not have information to transmit and since the polling operation is performed frequently, the "turn-around time" or the time to poll the entire string of remote input-output units can be quite lengthy.

An advantage of the present invention is that it achieves a substantial saving in the time required to switch an input-output control unit to a "read" status from a "write" status upon the termination of a "write" message.

Another advantage of the present invention is that it provides means for first setting an input-output control unit to a "write" status and then automatically switching it to a "read" status upon the termination of a "write" message, all in response to a single input-output command.

A further advantage of the present invention is that it prevents the loss of an acknowledgment signal from an input-output unit occurring as a result of an input-output control unit not being in a state to receive it.

An additional advantage of the present invention is that it achieves a substantial saving in the time required to poll a string of remote input-output units.

Another advantage of the present invention is that it achieves the polling of an entire string of input-output units in response to a single input-output command.

Yet another advantage of the present invention is that it provides an improved data communication system.

SUMMARY OF THE INVENTION

In brief, the preceding and additional advantages are achieved in a system similar to that described in the copending patent application of James Russell Bennett and Roger E. Packard, Ser. No. 626,176, filed on even date herewith and assigned to the assignee of the present invention. Means are provided whereby an input-output control unit is automatically caused to flip from a "write" state to a "read" state in response to the determination that a particular input-output instruction is being executed and in response to the determination that a message being written into a designated input-output unit has terminated. Determination that a message has terminated may advantageously be made by means of control code cards of the type described in the copending patent application of James Russell Bennett, Ser. No. 626,013, filed on even date herewith and assigned to the assignee of the present invention and which may also be considered incorporated by reference herein. In response to the determination of a "flip" command and the determination by the control code cards that a message being written has terminated, control circuitry responds by switching the input-output control unit from its "write" state to its "read" state. The control unit is then immediately able to accommodate an acknowledgment or other signal transmitted by the input-output unit being communicated with. An address memory within the processor and having a particular location therein reserved for each input-output unit may advantageously be used in conjunction with this invention. The address memory will then cause the signal transmitted by the input-output unit to be stored in addresses in main memory immediately following the addresses from which the preceding "write" signals were removed.

With respect to the polling of input-output units, the determination of a "poll" command and the end of a polling message written from memory are utilized to cause the input-output control unit to flip from a "write" state to a "read" state. A subsequent recognition of a "negative-acknowledge" signal from a remote input-output unit causes control circuitry responsive thereto to flip the control unit back to a "write" state in order to acommodate a polling message directed to another one of the input-output units. These operations are repeated until a message is received back from an input-output unit or the last polling message is reached. Upon termination of the message, the polling terminates and a result descriptor is stored in memory.

BRIEF DESCRIPTION OF THE DRAWING

The manner of operation of the present invention and the manner in which it achieves the above and other advantages may be more clearly understood by reference to the following detailed description when considered with the drawing in which.

DETAILED DESCRIPTION

Figure 1:
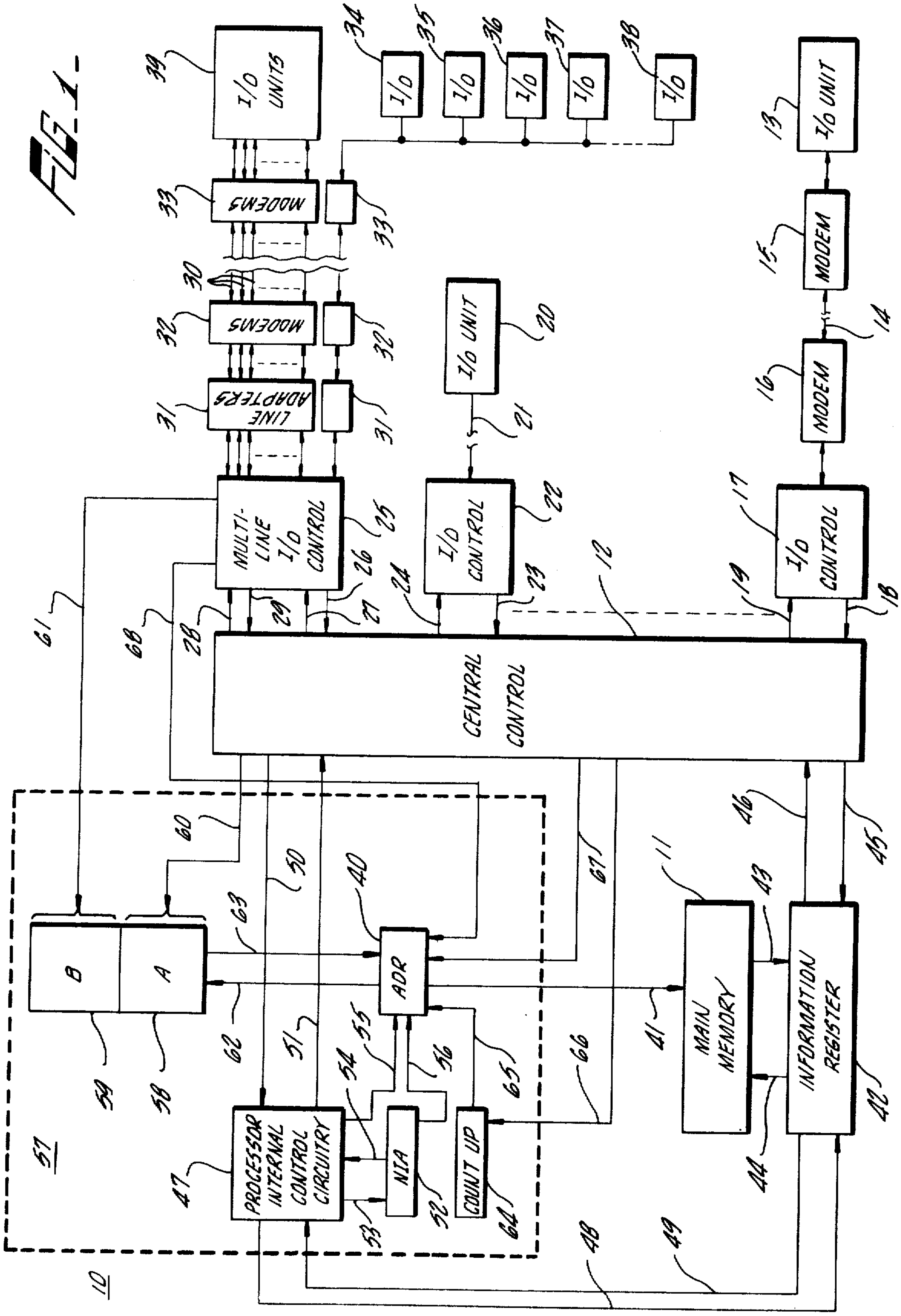
FIG. 1 depicts a block diagram of a computer system which incorporates the present invention.

FIG. 1 depicts a computer system of the type described in the aforesaid application of Bennett and Packard. It depicts central processing unit 10, main memory 11, and central control unit 12. Main memory 11 is time-shared by processor 10 and a plurality of input-output units. Access to memory 11 by the processor and the input-output units is controlled by the central control unit 11. Consequently, a plurality of input-output operations may proceed simultaneously and many units may thereby utilize the system simultaneously in such a way that each can be completely unaware of the use of the system being made by others. Whenever the processor or any of the input-output units desire access to memory 11 they indicate this desire by transmitting a signal to central control unit 12. The central control units then handles these requests for memory access and allocates memory accesses to the processor and the input-output units. Central control unit 12 has a fixed number of input-output channels, each of which is reserved for a single input-output control unit. Central control unit 12 may be considered, for purposes of description herein, to have twenty such input-output channels. A remote input-output unit 13 is connected to a first input-output channel of central control unit 12 through an input-output control unit 17 via modulator-demonstrators 15 and 16 (hereinafter referred to as a modem), at either end of a data communication line 14. The modems may be standard telephone data sets, such as the Bell System 202D Data Set referred to in Pat. 3,407,387. Such data sets are available from the telephone companies for transmitting binary information over standard telephone line equipment. The first input-output channel is indicated by lines 18 and 19. Although lines 18 and 19 are shown in FIG. 1 as single lines for the purposes of clarity, as are other lines depicted in the drawing, in actuality many lines will be utilized to transmit signals over the indicated paths. Input-output unit 20 is shown connected to the eighteenth input-output channel by line 21 and input-output control unit 22. The eighteenth input-output channel is similarly indicated by lines 23 and 24.

Some input-output units which must communicate with central control unit 12 are much slower than others with respect to their speed of operation. The allocation of a separate input-output channel to central control unit 12 for each such slower speed unit would be uneconomic. Transmission of data over data communication lines, for example, is relatively slow compared to the rate of transmission between a computer system and an input-output unit connected directly thereto. In FIG. 1 a multi-line input-output control unit 25 is utilized to connect a plurality of such data communication lines to central control unit 12 by means of only two input-output channels. These two input-output channels, the nineteenth and twentieth of central control unit 12, are indicated by the lines 26 and 27 and by the lines 28 and 29, respectively.

For purpose of description herein the multi-line control unit 25 will be considered to be connected to thirty-six data communication lines 30. Each of the data communication lines connects one or more input-output units to the multi-line control unit 25 by means of a line adapter 31, a first modem 32, and a second modem 33. A first one of the data communication lines 30 connects a plurality of input-output units 34, 35, 36, 37, and 38 via a single one of the adapters 31 to multi-line control unit 25. The remaining data communication lines similarly connect input-output units 39 to the multi-line control unit 25. The adapters, modems, and input-output units associated with these remaining data communication lines 30 are each shown as a single block for purposes of illustration. The nineteenth input-output channel is utilized to transmit commands between central control unit 12 and multi-line control unit 25, while the twentieth input-output channel is utilized to transmit data between these control units. Data transmitted between the computer system and the thirty-six input-output units connected to multi-line control unit 25 via the data communication line 30 is thus funnelled into a single input-output channel connecting control units 25 and 12. As a result the total number of input-output units which may be serviced by central control unit 12 has been increased from twenty to fifty-four.

Within the central processing unit 10 is address register 40. Address register 40 is utilized to address main memory 11 via line 41. Information is read from memory 11 to information register 42 via line 43 and is written into memory 11 from register 42 via line 44. Register 42 is connected to central control unit 12 via lines 45 and 46 and to control circuitry 47 within processor 10 via lines 48 and 49. Whether a read or write operation is performed is determined by a timing signal presented by central control unit 12 to register 42 in response to signals presented to it by the unit allocated access to memory 11. Control circuitry 47 is connected to central control unit 12 via lines 50 and 51, to Next Instruction Address register 52 within processor 10 by lines 53 and 54, and to address register 40 via line 55. Register 52 contains the address of the next instruction of a stored program being executed by processor 10. Register 52 is connected to address register 40 via line 56. Also within processor 10 is address memory 57. Address memory 57 comprises a section 58 and a section 59, which will hereafter sometimes be referred to as the "A" and "B" sections, respectively, of the address memory 57. Address memory 57 may advantageously be made up of a number of cards containing integrated transistor storage devices. Although address memory 57 is made up of such integrated circuitry it operates in the manner of a word-organized core memory. Section A of address memory 57 is addressed via line 60 by central control unit 12 only. Section A of address memory 57 has two word locations reserved therein for each of the twenty input-output channels which connect control unit 12 to the input-output units and several additional word locations reserved for use by the processor itself. Section B of address memory 57 is addressed via line 61 by multi-line control unit 25 only. Section B has two word locations reserved therein for each of the thirty-six data communication lines 30 serviced by multi-line control unit 25. Address register 40 serves as an information register for address memory 57 as well as an address register for memory 11. Addresses in main memory 11 are written into address memory 57 from register 40 via line 62 and are read from memory 57 into register 40 via line 63. The storing of addresses in the memory and transferring these addresses to the address register of the main memory is described in more detail in U.S. Pat. 3,359,544.

When information is written into or read from memory 11 during any given memory cycle, the contents of address register 40 will automatically be counted up by circuitry 64 via line 65 prior to the next succeeding memory cycle. The counting up operation is under the control of central control unit 12 via line 66 connecting control unit 12 and count-up circuitry 64. For purposes of description herein, memory 11 will be assumed to store individually addressable four-bit digits. It will further be assumed, however, that these digits will ordinarily be written into and read from memory 11, two digits at a time. Thus, during each memory cycle, count-up circuitry 64 will ordinarily increase the contents of address register 40 by two.

During the operation of the systems shown in FIG. 1, input-output commands are transferred two digits at a time to the input-output control unit associated with the particular input-output unit to which they relate and to reserved locations within address memory 57. After such a command has been received in full, a channel descriptor word is stored in memory 11 at a predetermined location therein, thereby designating that the complete command has been received. The address to which this descriptor word is to be stored is fed into register 40 by central control unit 12 via line 67. When the input-output command relates to an input-output unit associated with the multi-line control unit 25, the channel descriptor word stored in memory 11 via line 67 and the nineteenth input-output channel indicates that the nineteenth channel is again free to receive an input-output command directed to a different one of the input-output units associated with multi-line control unit 25. The freeing of the nineteenth input-output channel after an input-output command has been fully received, even though the command has not yet been executed, enables the nineteenth input-output channel to receive a second input-output command while the first is being executed by control unit 25. When the particular input-output command has been executed by the multi-line control unit 25, a result descriptor word is stored in memory 11 at an address fed into register 40 from multi-line control unit 25 via line 68 connected between multi-line control unit 25 and address register 40. Consequently, additional input-output commands relating to other ones of the input-output units associated with control unit 25 may be received via the nineteenth input-output channel while several previously received commands are in the process of being executed by control unit 25. Thus, commands relating to different ones of the input-output units associated with control unit 25 may simultaneously be executed by control unit 25. Such operations are described in greater detail in the copending application of James Russell Bennett and Roger E. Packard referred to hereinabove.

The line adapters 31 associated with the data communication lines 30 enable input-output units of different types to be connected to the same input-output control unit. These line adapters provide a common interface between each of the input-output units associated therewith and the multi-line control unit 25. Suitable line adapters are described, for example, in U.S. Pat. 3,390,379. Additionally, they change the electrical and logical levels of signals provided by the modems 32 and transform these signals into signals which are compatible with multi-line control unit 25. They also provide a timing function whereby they accommodate different clock rates required by the input-output units to the multi-line control unit 25. Furthermore, they provide bit handling circuitry and control circuitry whereby a bit may be temporarily stored and, additionally, provide logic circuitry for controlling the modems 32. Line adapters of this type are well-known and have been designed to operate with different types of input-output units. The modems 32 and 33 modulate digital data prior to its transmission over the data communication lines 30 and demodulate such signals received over the data communication lines 30. Such modems are available, for example, through the American Telephone and Telegraph Company.

During the operation of the system depicted in FIG. 1, the central control unit 12 allocates accesses to main memory 11 requested by the processor, by input-output units associated with the first eighteen input-output channels, and by input-output units associated with the nineteenth and twentieth input-output channels via data communication lines 30 and multi-line control unit 25. All of these devices may be operating simultaneously such that each is virtually unaware that memory 11 is also being addressed by the other devices. Thus, while only one of the devices will have access to memory 11 during any given memory cycle, any of the other devices may be allocated access to the memory during the immediately succeeding memory cycle. It is the central control unit 12 which determines which of the devices has access to memory 11 during any given memory cycle. As discussed previously, however, difficulties can arise in such a system with respect to input-output units which respond substantially immediately with an acknowledgment signal in response to a message transmitted to the input-output unit. The problem arises since the control unit associated with the particular input-output unit must be switched from a "write" state to a "read" state in order to receive the response signal being transmitted. The central control unit 12 may not be able to switch the input-output control unit to its "read" state soon enough to receive the acknowledgment signal. As a result, the acknowledgment signal may be lost. The present invention prevents such loss.

With respect to execution of commands by the system shown in FIG. 1, assume, for example, that the processor wishes to execute a command requested by software of the system. The address of the command to be executed is established in Next Instruction Address register 52. This address is transferred to address register 40 via line 56. During a first memory cycle granted to the processor, the first two digits of the command are read out of memory 11 into information register 42 and thence transferred via line 48 to processor control circuitry 47. At the end of this memory cycle the contents of register 40 are counted up by two by the counting circuitry 64 and the new contents of address register 40 are stored in a word location in Section A of address memory 57 reserved for the processor. By having granted memory to the processor during the memory cycle just discussed, the central control circuitry 12 automatically addressed the word location in address memory 57 reserved for the processor. Thus, at the end of the first memory cycle granted to the processor, the address of the next section of the command which the processor desires to execute is automatically stored in a location in Section A of address memory 57 which is reserved for the processor. When the processor is next granted access to memory 11, the address of the next section of the processor command is read from Section A of address memory 57 into address register 40 and the next two digits of the command are read from memory 11. The remainder of the command is fetched by the processor in a similar manner and the processor then commences to execute the command.

The readout of a data word proceeds in a manner identical to the readout of an instruction word. Processor requests for memory access may be transmitted to central control 12 via line 51 while grants of access to the processor may be transmitted to processor control circuitry 57 via line 50.

Requests for memory access by the input-output units proceed in a manner similar to that described for the processor. Thus, for example, if input-output unit 13 requests a memory access, this request will be transmitted via input-output control unit 17 and line 18 of the first input-output channel to central control unit 12. When memory access is granted to this input-output unit by central control unit 12, the central control unit 12 automatically addresses that location of Section A of address memory 57 which is reserved for the first input-output channel. Consequently, when input-output control unit 17 is in the midst of transferring data between input-output unit 13 and memory 11, this data will be transferred via register 42 and lines 45 and 46 into or from the addresses in memory 11 specified by the contents of the word location in Section A of memory 57 reserved for the first input-output channel. Time-sharing of a computer main memory 11 between a processor and input-output units such as units 13 and 20 by means of central control unit 12 and input-output control units 17 and 22 is known and will not be described at length herein. Such a modular computer system is described, for example, in U.S. Pat. 3,200,380.

The extension of such time-sharing to input-output units controlled by a single multi-line control unit has heretofore presented certain difficulties which, as described in the copending application of Bennett and Packard referred to previously, are eliminated by the use of address memory 57. Section B of address memory 57 is not addressed by central control unit 12 as is Section A but rather is addressed via line 68 solely by the multi-line control unit 25 itself. Section A of address memory 57 has only two word locations reserved therein for the twentieth input-output channel. The twentieth input-output channel, however, receives data from and transmits data over thirty-six different data communication lines 30. Section B of address memory 57 is reserved exclusively for these data communication lines 30 and contains two word locations therein for each such data communication line. When a particular one of the data communication lines 30 desires access to memory 11, this request is transmitted via multi-line input-output control 25 to central control unit 12. When a memory access for this request is granted by central control unit 12, a data character is transferred between an input-output unit associated with the particular line 30 and a predetermined address in memory 11 reserved for this particular data communication line 30 via information register 42; the predetermined address within memory 11 is selected by means of an address word in a location within Section B of address memory 57 which is reserved for that particular data communication line 30 which has been granted access. This reserved location within Section B of address memory 57 is itself addressed by means of line 68 from multi-line input-output control unit 25. In this manner, successive data characters transmitted via a particular one of the data communication lines 30 will be stored in adjacent locations within memory 11 despite the fact that many other characters via other ones of the data communication lines 30 may have been received intermediate to characters from the particular data communication line 30.

Figure 2:
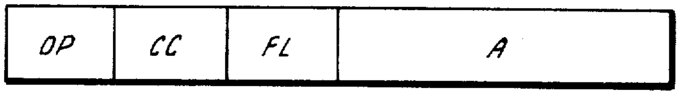
FIGS. 2 and 3 depict the format of illustrative commands which may be executed by the system shown in FIG. 1.
Figure 3:
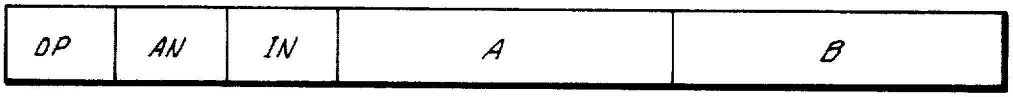

FIG. 2 depicts the format of an exemplary processor command which may be utilized in connection with the computer system of FIG. 1, while FIG. 3 depicts the format of a particular type of input-output command which may be utilized in the system.

FIG. 2 depicts an "initiate input-output" command, the execution of which is requested by software associated with the system. This command indicates that an input-output command is to be executed by the input-output control unit associated with an input-output channel designated by the command. The command shown in FIG. 2 is made up of two syllables, each of which comprises six digits. The first two digits, designated OP, indicate that an input-output command is to be performed. The next two digits, designated CC, indicate the particular input-output channel which is to be utilized. It will be assumed that these digits indicate that the twentieth input-output channel associated with multi-line control unit 25 is to be utilized. The next two digits, designated FL, indicate the field length of the input-output command which is to be executed. It will be assumed that the field length indicated is three syllables. The second syllable of "initiate input-output" command shown in FIG. 2 indicates the address of the input-output command which is subsequently to be executed.

Initially, the next instruction address register 52 will contain the address of the first digit of the OP digits shown in FIG. 2. In a well-known manner the "initiate input-output" command shown in FIG. 2 will be fetched two digits at a time by the processor and stored in control circuitry 47. Alternatively, the fetched command may be stored in a location within the address memory 57 reserved for the processor.

The processor will then execute the "initiate input-output" command by indicating to central control unit 12 via line 51 that an input-output command is to be executed by control unit 25. Additionally, the processor stores the A address of the command shown in FIG. 2 in a location in Section A of address memory 57 which is reserved for the processor.

During succeeding memory cycles allocated to the processor, it will fetch the input-output command depicted in FIG. 3. The processor transmits the OP digits, AN digits, and IN digits of the command shown in FIG. 3 to multi-line control unit 25 and stores the A and B addresses of the command shown in FIG. 3 in a word location of Section A of address memory 57 reserved for the processor. Subsequently, processor control circuitry 47 notifies central control 12 via a signal transmitted on line 51 that the fetch of the command depicted in FIG. 3 has been completed. Next the A and B addresses of the command in FIG. 3 are transferred via line 63 to address register 40 and subsequently stored in two word locations in Section A of address memory 57 which are reserved for the multi-line control unit 25. At this time execution of the command depicted in FIG. 3 is turned over to multi-line control unit 25 and the processor is free to perform other functions.

It is apparent from the foregoing that the fetch and execution of the "initiate input-output" command, followed by the fetch of a particular input-output command requires a relatively large number of memory cycles. Additionally, since central control unit 12 receives requests for memory access from a large number of units, the time required for the preceding operations directed to a particular input-output unit may be substantially increased. As a result, for example, an acknowledgment signal transmitted by a particular input-output unit in response to a "write" message received by it, may be transmitted to its associated control unit while the control unit is still waiting for a "read" command. In prior art systems, such a control unit is switched to a "read" state as a result of the following steps: Detection of the last character of a "write" message; storage in memory of a descriptor word; transmission to the processor of an interrupt signal; detection by software of what next operation is required; generation by software of an "initiate input-output" command; fetch and execution by the processor of this command; fetch by the processor of an input-output command; and recognition by the input-output control unit that the fetched input-output command is a "read" command. The present invention enables the input-output control unit automatically to switch at the desired time from one state to the other. With respect to interrogation of a single input-output unit, the present invention enables its associated control unit to switch from a "write" state to a "read" state immediately upon termination of a "write" message. With respect to the polling of a string of input-output units communicating with the system via a single line, the present invention enables the control unit associated with this line to repeatedly switch back and forth between its "read" state and its "write" state so long as negative-acknowledgment signals are returned by the polled input-output units.

The switching of a particular input-output control unit from one state to another is effected in response to a particular input-output command, the format of which is depicted in FIG. 3. This command will be denoted a "flip" command when it is directed to a single input-output unit and a "poll" command when it is directed to the polling of a string of input-output units transmitting data over a single line. The OP digits of the command depicted in FIG. 3 will indicate that such a "flip" or "poll" command is to be executed. The AN digits of the command will specify a particular one of the data communication lines 30 when a preceding "initiate input-output" command has selected multi-line input-output control 25. The two digits of the command designated as the IN digits constitute variant digits which, under certain circumstances, may effect changes in either the OP or AN digits. For purposes of the present discussion, the IN digits will not be utilized. The A address depicted in FIG. 3 represents an address in memory 11 where a first character to be transmitted from memory 11 via the selected data communication line is stored. The B address of the command depicted in FIG. 3 may represent a final address in an allocated section of memory 11 beyond which data may not be received or removed during the execution of the input-output command of FIG. 3.

The manner in which such "flip" or "poll" commands may be executed will now be discussed in conjunction with FIGS. 4 and 5 which depict in greater detail the multi-line control unit 25 shown in FIG. 1. Operation of multi-line control unit 25 as shown in FIG. 1 is similar to that disclosed in the copending application of James Russell Bennett referred to previously. It will be first be assumed that "initiate input-output" command depicted in FIG. 2 has specified that the subsequent input-output command will be executed by control unit 25. It will further be assumed that the input-output command depicted in FIG. 3 is a polling command directed to the first one of the data communication lines 30. During the fetch of the polling command depicted in FIG. 3 the two OP digits are fetched from memory 11, transmitted via register 42 and line 46 to the central control unit 12, and thence transmitted via line 27 of the nineteenth input-output channel to the multi-line conrol unit 25. The two OP digits received by control unit 25 over line 27 are directed by control circuitry 69 and line 70 to register 71. During a succeeding memory cycle, the AN digits are transmitted to multi-line control unit 25 and directed by control circuitry 69 and line 72 to register 73. Similarly, during a subsequent memory cycle the IN digits of the command shown in FIG. 3 are transmitted to multi-line control unit 25 and directed to register 74 by control circuitry 69 and line 75. Subsequently the A and B addresses of the command in FIG. 3 are read out of memory 11 and stored in the two word locations in Section A of address memory 57 which are reserved for the multi-line control unit 25. At this time, the processor has completed fetch of the command shown in FIG. 3 and execution of this command is turned over to multi-line control unit 25 while the processor is free to perform other functions.

Figure 4:
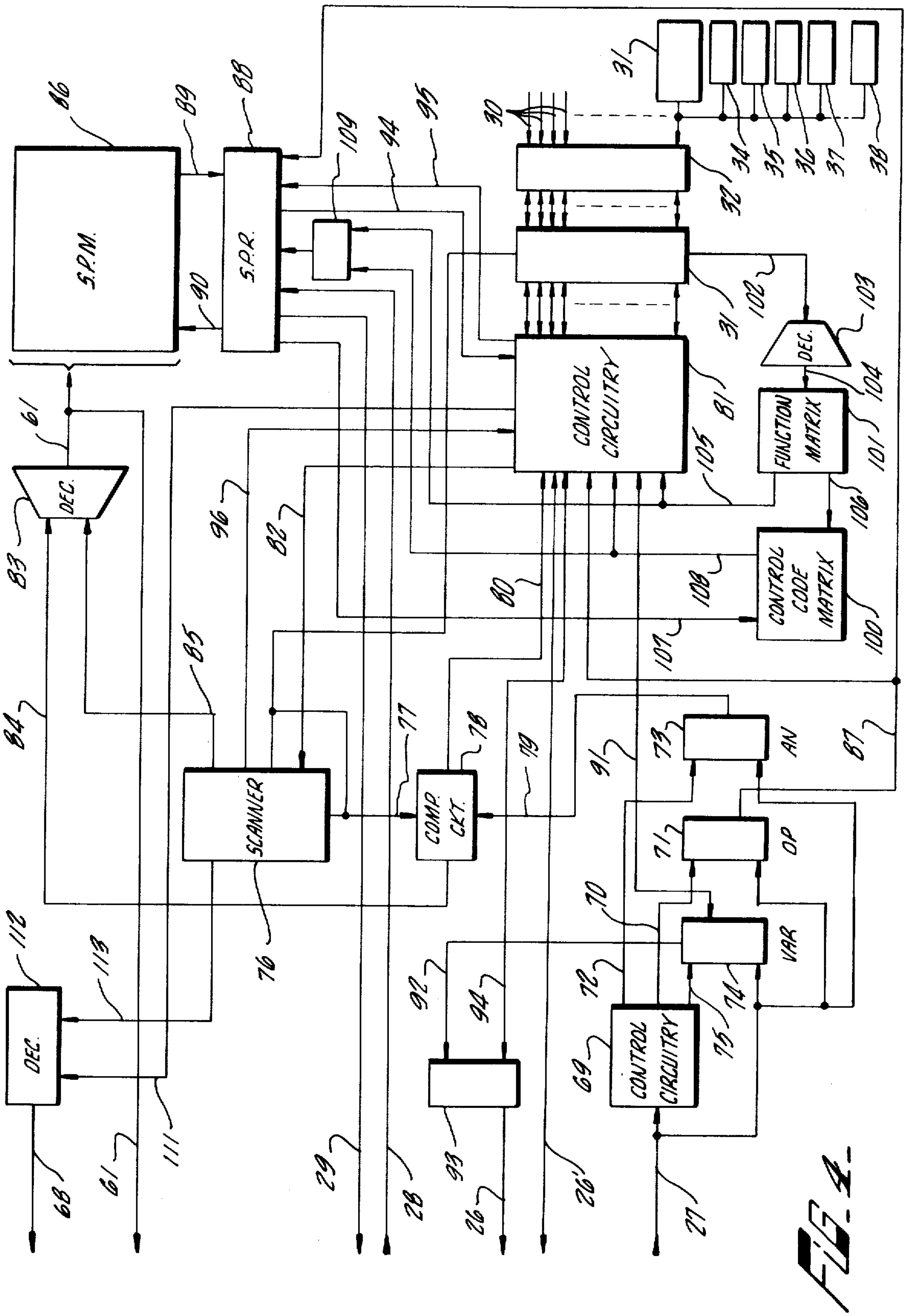
FIG. 4 depicts in greater detail the multi-line control unit shown in FIG. 1.

Scanner 76 sequentially presents signals on thirty-six output lines 77, shown as a single line in FIG. 4 for purposes of illustrative clarity, which are associated with the thirty-six line adapters 31. Compare circuit 78 is connected to scanner 76 via lines 77 and is connected to register 73 by line 79. Scanner 76 sequentially scans the thirty-six line adapters until it scans that adapter which is identified by the contents of register 73. At this time, compare circuit 78 recognizes that scanner 76 is pointing at the line adapter identified by the contents of register 73. When this comparison is made, a signal on line 80 from compare circuit 78 notifies control circuitry 81 that there has been a comparison and control circuitry 81 via a signal on line 82 thereby causes the scanner 76 to stop in this position. At this time, signals from compare circuit 78 and scanner 76 are applied to decoder 83 via lines 84 and 85, respectively. Decoder 83 decodes the signals on line 85 into a signal on one of thirty-six output lines 61. These lines 61 are used to address thirty-six word locations contained in scratchpad memory 86 and to address the word locations reserved in Section B of address memory 57 for the thirty-six data communication lines 30. Scratchpad memory 86 may advantageously be identical in structure to address memory 57. The word locations in scratchpad memory 86 are related to respective ones of the thirty-six data communication lines 30. The comparison detected by circuitry 78 causes the contents of register 71, the OP digits, to be transferred via line 87 to control circuitry 81 and to scratchpad register 88 and also causes the A and B addresses of the command depicted in FIG. 3 to be transferred to the two word locations in Section B of address memory 57 which are reserved for the first one of the data communication lines 30. The scratchpad memory 86 has a word location reserved therein for each of the data communication lines 30. As scanner 76 stops at a particular data communication line, the word in memory 86 reserved for the particular line is read into register 88 via line 89 and written back into memory 86 via line 90 when scanner 76 resumes scanning.

Upon the reception of the OP digits into register 88, control circuitry 81 inserts a channel result decriptor word into register 74 via line 91, and subsequently causes this word to be transmitted to central control unit 12 via line 26 by means of line 92 and control circuitry 93 in response to a signal applied to line 94 by control circuitry 81. The central control unit 12 inserts into address register 40 via line 67 an address in memory 11 reserved for a channel result descriptor word from multi-line control unit 25. Central control unit 12 then transmits the result descriptor word received over line 26 into this address in memory 11 via line 45 and register 42. Storage of this channel result descriptor word indicates that the command depicted in FIG. 3 has been accepted by multi-line control unit 25 and that the nineteenth input-output channel is again available to accept input-output commands directed to ones of the data communication lines 30 associated with multi-line control unit 25 other than the first data communication line 30. At this time, multi-line control unit 25 proceeds to execute the command. Lines 94 and 95 connect register 88 to control circuitry 81 and line 96 connects scanner 76 to control circuitry 81. Although the lines 94 and 95 are depicted in FIG. 4, for purposes of clarity, as being single lines, in actuality they will comprise a number of lines between register 88 and control circuitry 81. The control circuit 81 in combination with each of the line adapters 31 operates to transfer data between the register 88 and each of the remote input-output units. In Pat. 3,390,379 there is described many of the details of a system for accomplishing this transfer, although much of the function of the control circuit 81 is included within the adapters described in the patent. However, the principles necessary to the design of the control circuitry required in the control circuit 81 and the adapters 31 is well known and can be readily implemented from the teaching of the patent.

Figure 5:
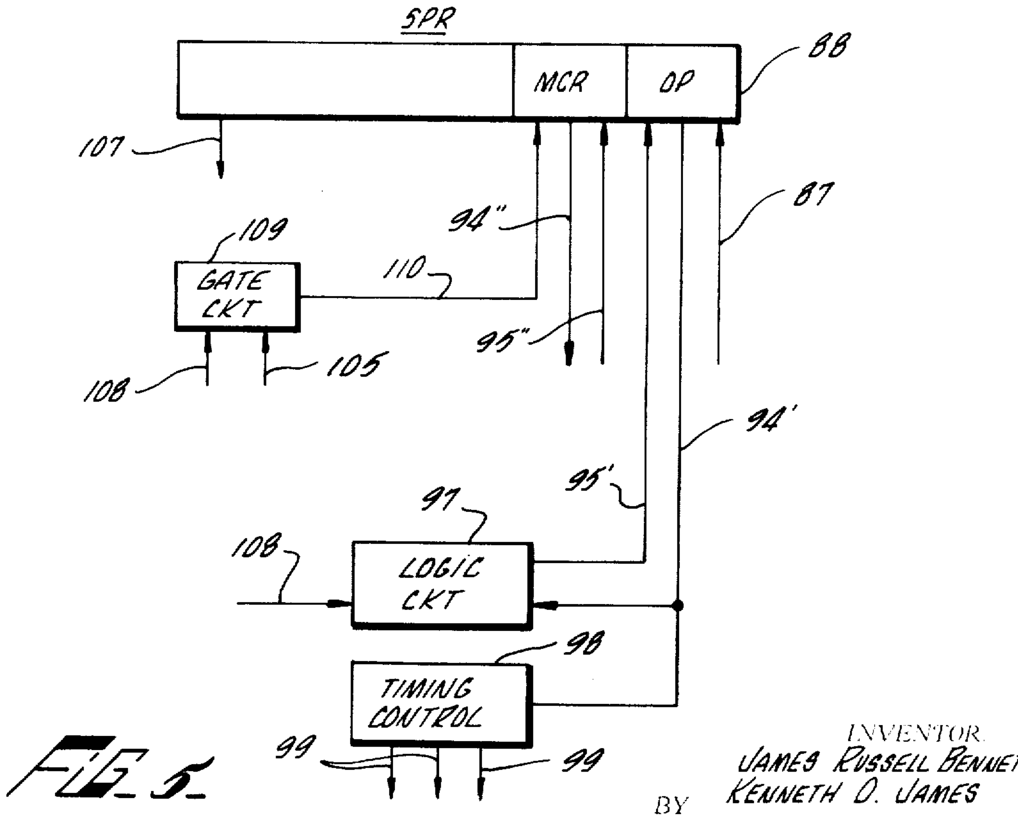
FIG. 5 depicts in greater detail a portion of the multi-line control unit shown in FIG. 4.

FIG. 5 depicts register 88 and lines connected thereto in somewhat greater detail. The section of register 88 in which the OP digits are stored is depicted as an OP section with lines 87, 94′, and 95′ connected thereto. Lines 94′ and 95′ represent two of the lines depicted generally in FIG. 4 as lines 94 and 95. The particular OP digits stored in register 88 are identified to logic circuit 97 and to timing control circuit 98 by means of line 94′. Timing control circuit 98, which is a portion of control circuitry 81, responds to the particular command manifested by the OP digits and in response thereto presents signals on its output lines 99. Signals on output lines 99 are utilized by control circuitry 81 to present signals to central control unit 12 via line 26′ which controls whether accesses to memory 11 effect a removal of information from memory 11 or a storage of information into memory 11.

The particular OP digits which indicate that a polling command is to be executed may advantageously be similar to those which denote a "write" operation. Consequently, in response to bits identifying a polling command being inserted in the OP position in register 88, timing control circuit 98 will present signals on its outputs 99 which cause the multi-line control unit 25 initially to be in a "write" state.

During execution of the polling command, an initial polling message, the first character of which is stored in the address in memory 11 manifested by the A address in the command depicted in FIG. 3, will be transmitted via the first one of the data communication lines 30 to input-output units 34 through 38. Since each of these input-output units is connected to the same data communication line, they will be of the same type and will utilize a single line adapter 31. They may, for example, comprise IBM 1050 computers. Each of the input-output units 34 through 38 will respond to a unique polling message. Thus, the initial polling message transmitted over the first one of the data communication lines 30 will be directed to a particular one of the input-output units 34 through 38, and this particular one of the units will respond to this polling message. Thus, for example, the first polling message may be directed to input-output unit 34 and, upon its receipt of this polling message, it will respond by transmitting an acknowledgment signal should it have a message to be transmitted or a negative-acknowledgment signal if it should have no message to be transmitted.

Assume, for example, that the first input-output unit 34 has no message to be transmitted to the system and that it consequently transmits a negative-acknowledgement signal comprising a single character. In accordance with the present invention, the input-output control unit 25 is automatically switched from its "write" state to a "read" state in order to be ready to receive the negative-acknowledgment signal from input-output unit 34.

Control code matrix 100 and function matrix 101 shown in FIG. 4 are utilized to determine the proper time for the switching of multi-line input-output control 25 from one state to the other. During the execution of an input-output command by control unit 25, the line adapter 31 associated with the selected one of the data communication lines 30 presents signals on adapter identification bus 102 which identify the type of input-output unit associated with the selected data communication line 30. As described in greater detail in the copending application of James Russell Bennett referred to hereinabove, these identification signals on bus 102 are decoded by decoder 103. Decoder 103 then presents a signal on one of a plurality of output lines 104 which in turn is used by function matrix 101 to present signals on particular ones of a number of function control lines 105. Signals on these lines 105 are utilized to identify to control circuitry 81 the type of input-output units associated with the selected data communication line. Additionally, function control lines 106 from function matrix 101 are transmitted to control code matrix 100. Control code matrix 100 utilizes these signals on lines 106 to select a particular control code card within matrix 100. A character being transmitted between control unit 25 and the selected data communication line 30 and temporarily stored in register 88 is compared via line 107 with a set of control code characters manifested on the selected one of the control code cards. If a comparison is made, indicating that the character being compared is a control code character, a signal is presented to control circuitry 81 via lines 108. Both the function matrix 101 and control code matrix 100 may advantageously be made up of removable cards which contain integrated circuitry thereon.

As a polling message is transmitted via the first data communication line 30 to the input-output units 34 through 38, control code matrix 100 recognizes all control code characters within this message. Another portion of register 88 comprises a message control register denoted MCR in FIG. 5 which is utilized to manifest positional information concerning a message being transmitted. It indicates this positional information as a result of being advanced upon the detection of control code characters transmitted within the message. Control code characters are detected by matrix 100 and sent to control circuitry 81 on line 108 and circuitry 81 in turn presents signals on line 95″ which advance the message control register within register 88, thereby enabling this portion of register 88 to indicate the position within a message of the character being transmitted at any given time.

When a polling message transmitted via the first data communication line 30 to input units 34 through 38 terminates, the control code matrix 100 recognizes an "end of message" control character and in response thereto presents a signal on one of the lines 108 which indicates that the end of message has been detected. This signal, in conjunction with a signal on one of the lines 105, is presented to gate circuit 109 which, responsive thereto, presents a signal on its output line 110 which clears the message control register. The signal on line 108 is also presented to logic circuit 97 which, in response thereto and to a signal presented on line 94′, presents a signal on line 95′ which effects a change in the OP digits stored in register 88. The OP digits stored in register 88 are now changed to indicate that a "read" portion of the "poll" command is now to be executed. Upon being so changed, the new OP digits stored in register 88 present a signal on line 94′ to timing control circuit 98 which causes circuit 98 to present signals on output lines 99 effective to switch multi-line control unit 25 from its "write" state to a "read" state. Thus, it is seen that multi-line input-output control unit 25 is automatically switched to a "read" state when the end of a polling message is detected during the execution of a polling command.

Subsequent to the end of the first polling character the input-output unit 34, assumed to be the particular unit interrogated by this first polling message, transmits a message in response thereto. It will further be assumed that this responsive message is a single character negative-acknowledgment message indicating that the input-output control unit does not have a message to be sent to the system. The transmitted negative-acknowledgment character is itself detected by control code matrix 100 which presents signals indicative of such detection on lines 108. These signals on lines 108 in conjunction with the OP digits now present in register 88, and manifested by signals presented on lines 94′, cause logic circuit 97 to present signals on lines 95′ which reinstate the initial OP digits in register 88. These OP digits in register 88 then present signals on lines 94′ to timing control circuit 98 which cause it again to present signals on lines 99 which are effective to switch multi-line input-output control unit 25 automatically back to its "write" state. Each time the multi-line input-output control unit 25 is switched from one state to the other, signals presented on lines 108 and 105 to gate circuit 109 effect signals on line 110 which reset the message control register portion of register 88.

After the negative-acknowledgment reply signal received from input-output unit 34 has been detected, a second polling message is transmitted to the units 34 through 38 via the first data communication line 30. This second polling message will be read from addresses in memory 11 which follow immediately after the first polling message read from memory 11. Thus, the address A shown in the command depicted in FIG. 3 indicates the address of the first polling character and immediately thereafter memory 11 will store succeeding polling characters.

The second polling character transmitted via the first data communication line 30 will be assumed to be addressed to the input-output unit 35. At the completion of this polling message the multi-line input-output control unit 25 will again be switched to its "read" state in the manner described previously. If input-output unit 35 also responds with a negative-acknowledgment signal, the multi-line input-output control unit 25 will again be switched to its "write" state as described previously and a third polling message will be transmitted via this data communication line 30. The end of this polling message will similarly be detected and multi-line input-output control 25 will again switch to its "read" state. If this "read" polling message is assumed to be directed to input-output unit 36 and this unit does have a message to be transmitted to the system, it will respond by transmitting this message via the first data communication line 30. Multi-line input-output control unit 25 is in its "read" state and ready to receive this message. The message will be stored in the address locations in memory 11 immediately succeeding the addresses wherein the third polling message was stored. At the completion of the message transmitted by input-output unit 36, control code matrix 100 will detect the end of this message and in response thereto control circuitry 81 will present a signal on line 111 to decoder 112. Additionally, scanner 76 presents a signal on line 113 to decoder 112. In response to these signals, decoder 112 presents signals on lines 68 to address register 40 and central control unit 12 stores an adapter result descriptor in memory 11 at the address therein specified by the signals presented to address register 40 by line 68. The adapter result descriptor is assembled in register 74 and thence transmitted to central control unit 12 by control circuitry 81 in a manner similar to that previously described with respect to the channel result descriptor.

The preceding discussion has disclosed the manner in which a "poll" command may be executed in accordance with the present invention. If only one input-output unit associated with a particular one of the data communication lines 30 is to be interrogated, this may be accomplished in accordance with the present invention by means of the execution of a "flip" command. Such a command effects only one switching of the input-output control unit associated with the particular input-output unit. Thus, in the execution of a "flip" command, the end of an initial interrogating message is detected by control matrix 100 and a single flip of the input-output control unit from its "write" state to its "read" state is effected. The subsequent reply from the addressed input-output unit will then terminate the execution of the command whether this reply is a negative-acknowledgment or a full message.

Although the discussion herein has been directed to the execution of a "poll" command or "flip" command in conjunction with a multi-line input-output control unit, it is apparent that either of these commands may be executed in conjunction with a single line input-output control unit as well.

The execution of a "flip" command in accordance with the principles of this invention may effect a switch from a "write to control" to a "read to control" operation, from a "write to control" to a "read transparent" operation, or from a "write transparent" to a "read to control" operation. The "write to control" and "read to control" operations each terminate upon the detection by control code matrix 100 of an "end of message" control character. The "write transparent" or "read transparent" operations on the other hand are terminated as a result of the characters being read from memory 11 in a "write transparent" operation reaching the B address set forth in the command depicted in FIG. 3, or the characters being stored in memory 11 in a "read transparent" operation reaching the B address set forth in the command depicted in FIG. 3. The execution of such a transparent transmission operation is discussed in the copending application of James Russell Bennett and Ronald R. Brookman, Ser. No. 626,175 filed on even date herewith and assigned to the assignee of the present invention.

All of the circuits shown in the accompanying drawing in block diagram form are of a type well known to persons skilled in the art. All of the circuits designated as control circuits, for example, comprise well-known logic circuitry which may easily be designed to perform the functions specified for these circuits.

What has been described is considered to be only an illustrative embodiment of the present invention and, accordingly, it is to be understood that various and numerous other arrangements may be devised by one skilled in the art without departing from the spirit and scope of this invention.

What is claimed is:

1. A digital data transmission system comprising:
- a main memory;
- a plurality of input-output channels communicating with the memory;
- central control means for allocating accesses to main memory by the input-output channels;
- a plurality of terminal units;
- a plurality of input-output control units associated with respective ones of the input-output channels; and
- a plurality of data communication lines for transmitting digital information between at least one of the control units and the terminal units;
- at least one of the input-output control units comprising:
- means responsive to bits manifesting a particular input-output command received via its associated input-output channel for placing the input-output control means in a "write" state;
- register means storing a control code character for transmission over an associated one of said data communication lines;
- means for transferring said control code character from the register means to the associated data communication line for transmission to a terminal unit; and
- means responsive to a particular control code character in said register means for automatically switching the input-output control unit to a "read" state when the control code character is transmitted to a terminal unit over said data communication line.

2. A digital data transmission system according to claim 1 in which the input-output control unit further comprises:

- means responsive to the "read" state of the input-output control means for transferring a character received on a data communication line to said register means; and
- means responsive to a particular control code character received in said register means over the data communication line for automatically switching the input-output control unit back to the "write" state.

3. A digital data transmission system comprising:
- a main memory;
- a plurality of input-output channels communicating with the memory;
- a central control unit for allocating accesses to main memory by the input-output channels;
- an input-output unit;
- an input-output control unit associated with the input-output unit and with a particular one of the input-output channels;
- a data communication line for transmitting digital information connected between the input-output unit and the input-output control unit; and
- processor means for reading an "initiate input-output" command from main memory;
- the command comprising bits manifesting the particular input-output channel and bits manifesting the address in main memory of an "input-output" command associated with this channel;
- the processor means reading the "input-output" command from main memory;
- the command comprising bits indicating that a "flip" command is to be executed and bits indicating the address in main memory where a message to be transmitted to the input-output unit commences;
- the central control unit transmitting the "flip" command bits to the input-output control unit;
- the input-output control unit comprising:
- means responsive to the "flip" command bits for placing the input-output control unit in a "write" state;
- means for transmitting to the data communication line the message to be transmitted to the input-output unit;
- means for recognizing the end of the message; and
- means including the placing means, responsive to recognition of the end of the message, for switching the input-output control unit to a "read" state.

4. A digital data transmission system comprising:
- a main memory;
- a plurality of input-output channels communicating with the memory;
- a central control unit for allocating accesses to main memory by the input-output channels;
- a plurality of input-output units;
- an input-output control unit associated with the input-output units and with a particular one of the input-output channels;
- a data communication line for transmitting digital information connecting the input-output units to the input-output control unit; and
- processor means for reading an "initiate input-output" command from main memory, this command comprising bits manifesting the particular input-output channel and bits manifesting the address in main memory of an "input-output" command associated with this channel;
- the processor means further comprising means for reading the "input-output" command from main memory, this command romprising bits indicating that a "poll" command is to be executed and bits manifesting the address in main memory where a first polling message directed to a first one of the input-output units commences, polling messages directed to successive ones of the input-output units being stored in main memory at addresses successively following the addresses in which the first polling message is stored;

the processor means further comprising means for reading the successive polling messages from main memory;
the central control unit comprising means for automatically transmitting to the input-output control unit the bits manifesting the "poll" command and polling messages as they are read out of main memory, the bits being read out of main memory a character at a time with each character comprising a predetermined number of bits;
the input-output control unit comprising:
means responsive to the "poll" command bits for placing the input-output unit in a "write" state;
means for transmitting characters comprising the successive polling messages to the data communication line;
means for detecting control code characters received by the input-output control unit;
means including the placing means, responsive to detection of a control code character indicating the end of any polling message for switching the input-ouput control unit to a "read" state; and
means including the placing means, responsive to a negative acknowledgement character received via the data communication line for switching the input-output unit to its "write" state.

5. A digital data transmission system comprising:
a main memory;
a plurality of input-output channels communicating with the memory;
a central control unit for allocating accesses to main memory by the input-output channels;
an input-output unit;
an input-output control unit associated with the input-output unit and with a particular one of the input-output channels;
a data communication line for transmitting digital information connected between the input-output unit and the input-output control unit; and
processor means for reading an "initiate input-output" command from main memory, this command comprising bits manifesting the particular input-output channel and bits manifesting the address in main memory of an "input-output" command associated with this channel;
the processor means further comprising means for reading the "input-output" command from main memory, this command comprising bits indicating that a particular command is to be executed and bits manifesting the address in main memory where an interrogation message directed to the input-output unit commences;
the processor means further comprising means for reading the interrogation message from main memory;
the central control unit comprising means for automatically transmitting to the input-output control unit the bits manifesting the particular command and the interrogation message as they are read out of main memory, the bits being read out of main memory a character at a time with each character comprising a predetermined number of bits;
the input-output control unit comprising:
register means;
means for storing the bits manifesting the particular command in a command section of the register;
timing control means responsive to the bits stored in the command section of register which manifest the particular command for presenting signals on timing lines effective to place the input-output control unit in a "write" state;
means for transmitting characters comprising the interrogation message to the data communication line;
means for detecting control code characters received by the input-output control unit; and
logic circuitry responsive to detection of a control code character indicating the end of the interrogation message and to the particular command bits in the command section of the register for effecting a particular change in the bits stored in the command section;
the timing control means responsive to the particular change in the bits stored in the command section of the register presenting signals on the timing lines effective to switch the input-output control unit to a "read" state.

6. A digital data transmission system comprising:
a main memory;
a plurality of input-output channels communicating with the memory;
a central control unit for allocating accesses to main memory by the input-output channels;
a plurality of input-output units;
a plurality of communication lines for respectively transmitting data words between the system and the plurality of input-output units;
a plurality of line adapters coupled respectively to the plurality of communication lines, each line adapter presenting a combination of binary signals identifying the type of input-output unit on its associated line;
a multi-line input-output control unit for selectively coupling the communication lines to a first one of the input-output channels; and
processor means for reading an "initiate input-output" command from main memory, this command comprising bits manifesting the first input-output channel and bits manifesting the address in main memory of an "input-output" command associated with this channel;
the processor means further comprising means for reading the "input-output" command from main memory, this command comprising bits indicating that a "flip" command is to be executed, bits manifesting a particular one of the data communication lines, and bits manifesting the address in main memory where a message to be transmitted over the particular line commences;
the processor means further comprising means for reading the message from main memory;
the central control unit comprising means for automatically transmitting to the multi-line control unit the bits manifesting the "flip" command, the particular line and the message as they are read out of main memory, the bits being read out of main memory a character at a time with each character comprising a predetermined number of bits;
the multi-line input-output control unit comprising:
an adapter identification bus;
a scanning means for sequentially coupling each line adapter to the adapter identification bus;
a scratchpad memory having a word location reserved therein for each of the data communication lines;
a memory information register associated with the scratchpad memory;
means for halting the scanning means when the line adapter associated with the line identified by the bits manifesting the particular line is coupled to the identification bus;
means responsive to the scanning means for addressing the word location in scratchpad memory reserved for the particular line and reading the contents of this location into the memory information register;
means for storing the bits manifesting the "flip" command in a command section of the register;
timing control means responsive to the "flip" command bits stored in the register for presenting signals on timing lines effective to place the multi-line control unit in a "write" state;
means for transmitting characters comprising the message to the particular data communication line;

means for detecting control code characters received by the multi-line control unit; and logic circuitry responsive to detection of a control code character indicating the end of the message and to the "flip" command bits in the command section of the register for effecting a particular change in the bits stored in the command section;

the timing control means responsive to the particular change in the bits stored in the command section of the register presenting signals on the timing lines effective to switch the input-output control unit to a "read" state.

7. A digital data transmission system according to claim 6 in which the detecting means comprises means for decoding signals presented on the adaptor identification bus, and matrix means coupled to the decoder for comparing characters being tarnsmitted with a group of control code characters selected by the decoding means.

8. A digital data transmission system comprising:

a main memory;

a plurality of input-output channels communicating with the memory;

a central control unit for allocating accesses to main memory by the input-output channels;

a plurality of input-output units;

a plurality of communication lines for transmitting data words between the input-output channels and the plurality of input-output units, a first one of the lines transmitting data words between an input-output channel and a group of the input-output units each of which is of the same type;

a plurality of line adapters coupled respectively to the plurality of communication lines, each line adapter presenting a combination of binary signals identifying the type of input-output units on its associated line;

a multi-line input-output control unit for selectively coupling the communication lines to a first one of the input-output channels; and processor means for reading an "initiate input-output" command from main memory, this command comprising bits manifesting the first input-output channel and bits manifesting the address in main memory of an "input-output" command associated with this channel;

the processor means further comprising means for reading the "input-output" command from main memory, this command comprising bits indicating that a "poll" command is to be executed, bits manifesting the first one of the data communication lines and bits manifesting the address in main memory where a first polling message directed to a first one of the input-output units associated with the first line commences, polling messages directed to successive ones of the input-output units associated with the first line being stored in main memory at addresses successively following the addresses in which the first polling message is stored;

the processor means further comprising means for reading the successive polling messages from main memory;

the central control unit comprising means for automatically transmitting to the multi-line control unit the bits manifesting the "poll" command, the first data communication line and the polling messages as they are read out of main memory, the bits being read out of main memory a character at a time, with each character comprising a predetermined number of bits;

the multi-line input-output control unit comprising:

an adapter identification bus;

a scanning means for sequentially coupling each line adapter to the adapter identification bus;

a scratchpad memory having a word location reserved therein for each of the data communication lines;

a memory information register associated with the scratchpad memory;

means responsive to the bits manifesting the first data communication line for halting the scanning means when the line adapter associated with the first line is coupled to the identification bus;

means responsive to the scanning means for addressing the word location in scratchpad memory reserved for the first data communication line and reading the contents of this location into the memory information register;

means for storing the bits manifesting the "poll" command in a command section of the register;

timing control means responsive to the "poll" bits stored in the register for presenting signals on timing lines effective to place the multi-line control unit in a "write" state;

means for transmitting characters comprising the successive polling messages to the first data communication line;

means for detecting control code characters received by the multi-line control unit; and logic circuitry, responsive to detection of a control code character indicating the end of any polling message and to the "poll" bits stored in the command section of the register, for effecting a particular change in the bits stored in the command section;

the timing control means responsive to the changed bits stored in the command section of the register presenting signals on the timing lines effective to switch the multi-line control unit to a "read" state;

the logic circuitry, responsive to detection of a negative-acknowledgment control code character received by the multi-line control unit via the first data communication line from one of the group of input-output units and responsive to the changed bits stored in the command section, restoring the "poll" bits in the command section of the register.

9. A digital data transmission system according to claim 8 in which the detecting means comprises:

means for decoding signals presented on the adapter identification bus;

a function matrix; and a control code matrix;

the function matrix, responsive to the decoded signals from the bus, selecting a group of control code characters within the control code matrix;

the control code matrix comparing characters being transmitted with the selected group and presenting signals on control code lines in response to a comparison.

10. A digital data transmission system according to claim 9 in which the memory information register has a message control section therein and further comprising:

means for advancing the contents of the message control section in response to the detection of control code characters during the transmission of a message; and means for clearing the contents of the message control section in response to the detection of a control code character indicating the end of a polling message.

References Cited

UNITED STATES PATENTS

| | | | |
|---|---|---|---|
| 3,061,192 | 10/1962 | Terzian | 340—172.5 |
| 3,274,561 | 9/1966 | Hallman et al. | 340—172.5 |
| 3,297,996 | 1/1967 | Grady | 340—172.5 |
| 3,302,182 | 1/1967 | Lynch et al. | 340—172.5 |
| 3,418,638 | 12/1968 | Anderson et al. | 340—172.5 |

PAUL J. HENON, Primary Examiner

P. R. WOODS, Assistant Examiner